United States Patent
Godbersen

[19]

[11] Patent Number: 6,003,888
[45] Date of Patent: Dec. 21, 1999

[54] PONTOON BOAT CENTER LIFT TRAILER AXLE ASSEMBLY

[76] Inventor: Byron L. Godbersen, Lake LaJune Estates, Ida Grove, Iowa 51445

[21] Appl. No.: 09/028,100

[22] Filed: Feb. 23, 1998

Related U.S. Application Data

[62] Division of application No. 08/693,905, Aug. 5, 1996, abandoned.

[51] Int. Cl.⁶ .......................................................... F16F 1/38
[52] U.S. Cl. .................................... 280/124.169; 267/276; 301/127; 29/896.91; 29/896.93
[58] Field of Search ................................. 301/124.1, 127; 280/124.166, 124.169, 124.177; 267/273, 276, 279; 29/896.9, 896.91, 896.93

[56] References Cited

U.S. PATENT DOCUMENTS

| | | | |
|---|---|---|---|
| 2,723,870 | 11/1955 | Page | 280/124.169 |
| 2,951,710 | 9/1960 | Willets | 267/276 X |
| 3,353,840 | 11/1967 | Love | 280/124.169 |
| 3,879,781 | 4/1975 | Roschynialski . | |
| 3,974,924 | 8/1976 | Ullman . | |
| 3,993,324 | 11/1976 | Carrick . | |
| 4,023,222 | 5/1977 | Selby . | |
| 4,099,279 | 7/1978 | Park . | |
| 4,103,925 | 8/1978 | Palamara . | |
| 4,109,809 | 8/1978 | Clark . | |
| 4,114,772 | 9/1978 | Beelow . | |
| 4,136,791 | 1/1979 | Clark . | |
| 4,138,135 | 2/1979 | Hewitt . | |
| 4,243,242 | 1/1981 | Waits . | |
| 4,273,351 | 6/1981 | Salamander . | |
| 4,395,185 | 7/1983 | Whaley . | |
| 4,422,665 | 12/1983 | Hinnant . | |
| 4,519,738 | 5/1985 | Wood . | |
| 4,637,770 | 1/1987 | Swadell . | |
| 4,702,510 | 10/1987 | Davis . | |
| 4,801,153 | 1/1989 | Wilson . | |
| 5,114,168 | 5/1992 | Kehl . | |
| 5,385,362 | 1/1995 | Sohm . | |

FOREIGN PATENT DOCUMENTS 2740890   3/1978   Germany ............................... 267/276

Primary Examiner—Russell D. Stormer
Attorney, Agent, or Firm—Henderson & Sturm

[57] ABSTRACT

A torsion axle for a trailer for transporting a load such as a pontoon boat. The torsion axle assembly is part of a wheel unit for maintaining stability for the trailer during transport. The torsion axle is assembled to have two pairs of resilient elements and an elongated shaft housed between inner and outer elongated sections. The inner and outer elongated sections are held together temporarily by a weld and then releasably held together by releasable fasteners in a normal use position.

2 Claims, 7 Drawing Sheets

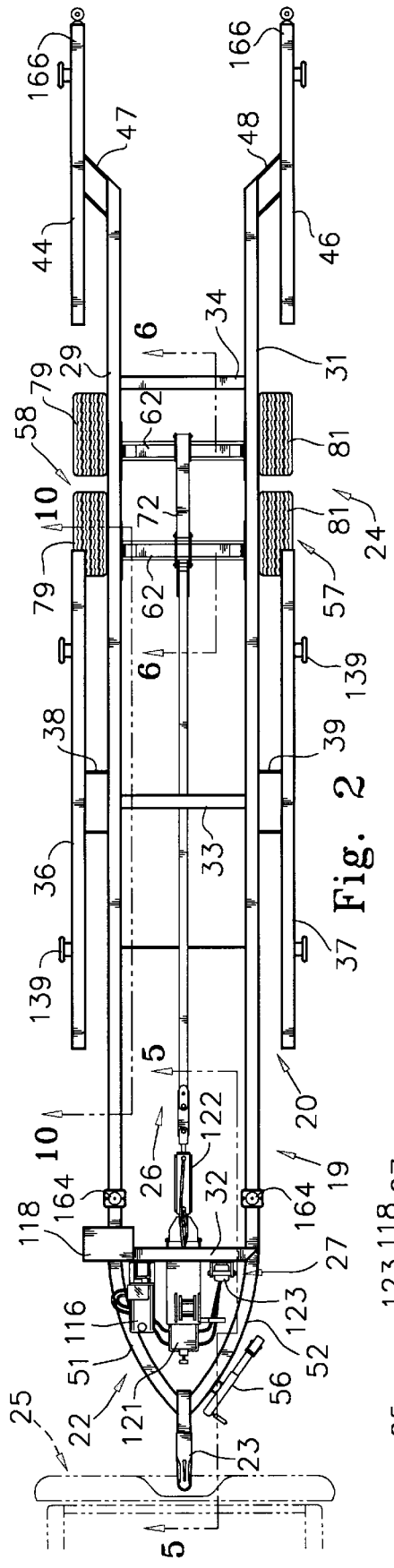
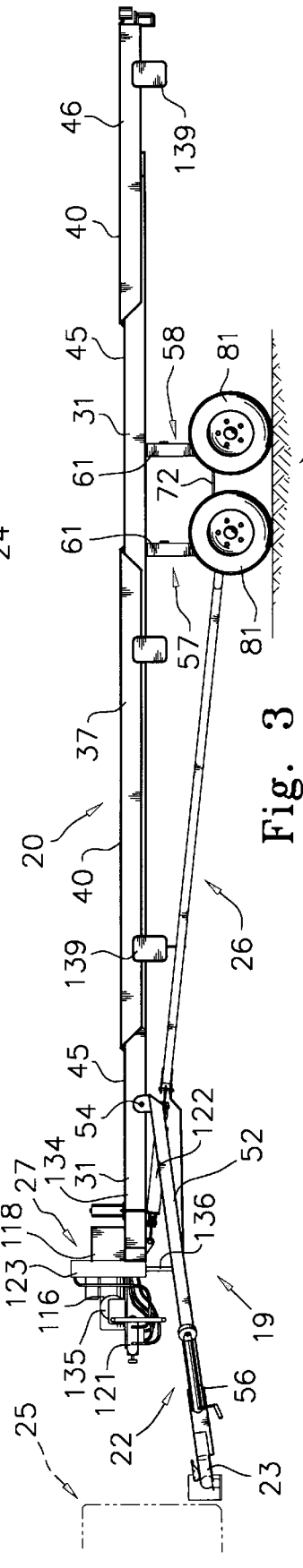
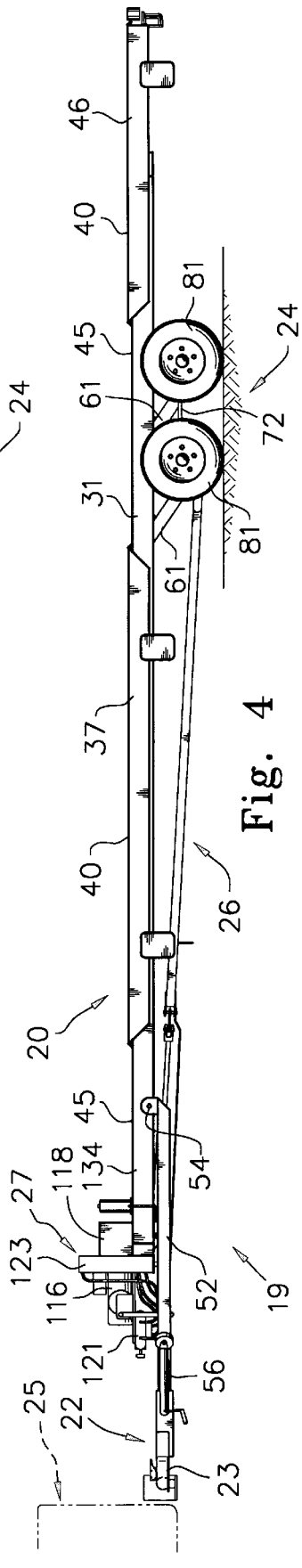
Fig. 2
Fig. 3
Fig. 4

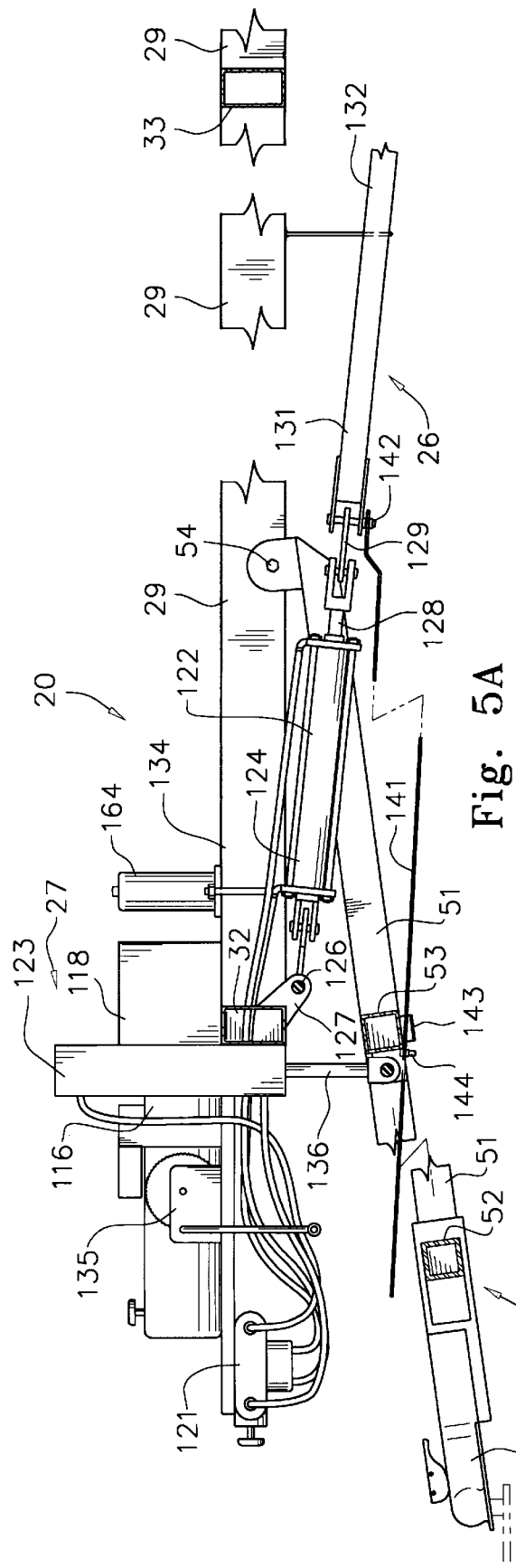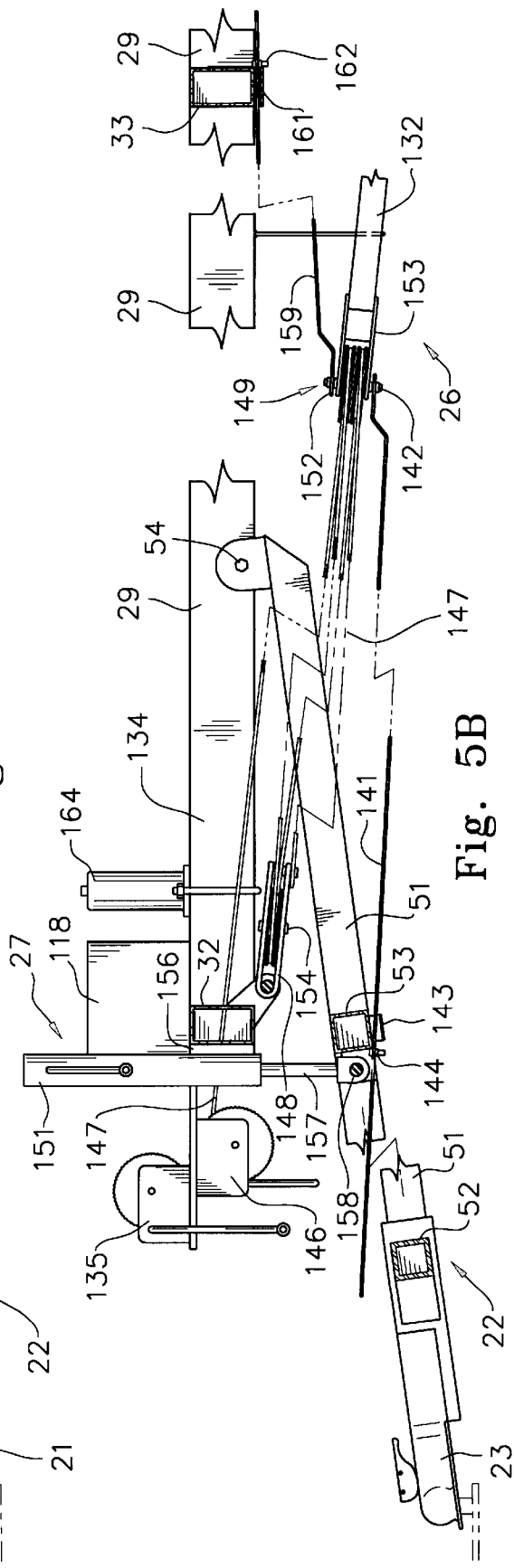

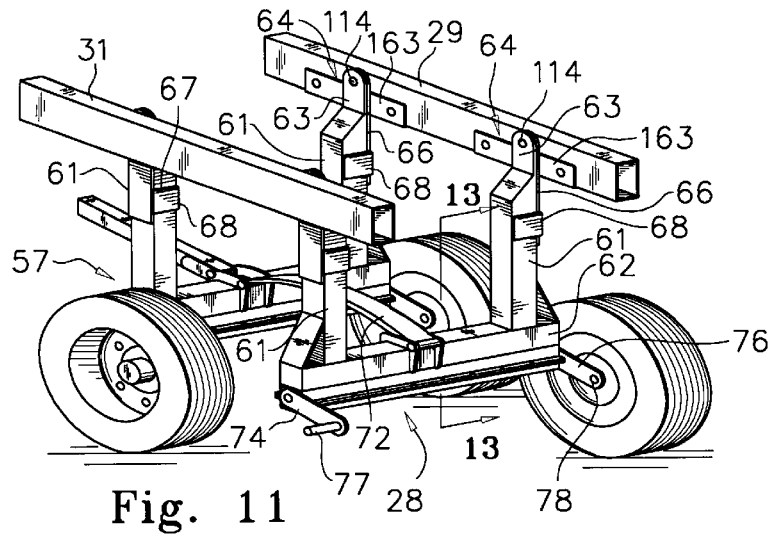
Fig. 11
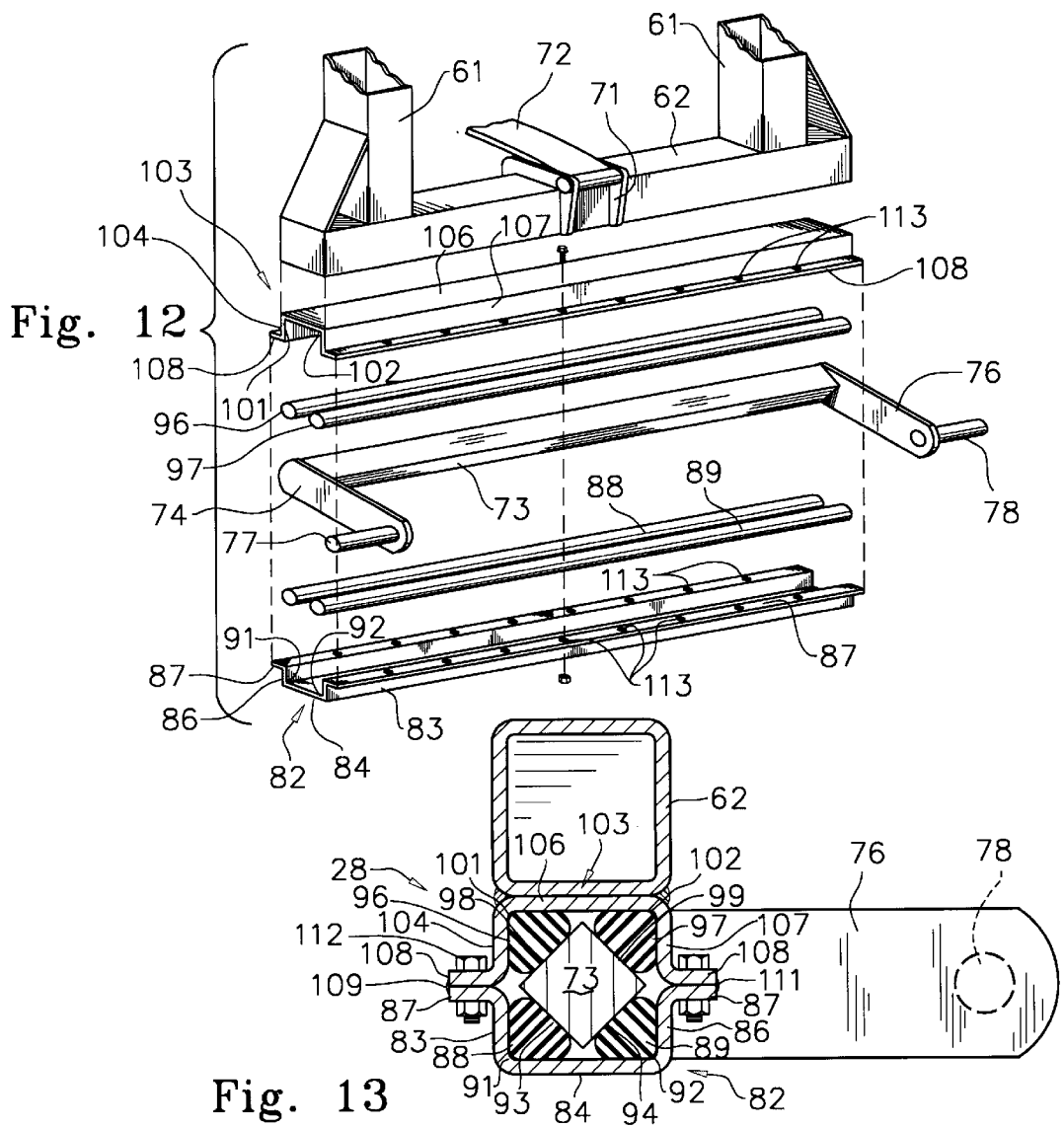
Fig. 12
Fig. 13

PONTOON BOAT CENTER LIFT TRAILER AXLE ASSEMBLY

This application is a divisional application of U.S. application Ser. No. 08/693,905 filed Aug. 5, 1996 now abandoned.

TECHNICAL FIELD

The present invention relates generally to boat carrying trailers, and more particularly to those of the type used specifically for transporting pontoon boats. More specifically, the trailer of this invention includes a wheel and torsional axle assembly operable to raise an elongated frame from a lowered position wherein the trailer can be moved underneath ground engaging pontoon boat, to a raised position for transporting the boat, the lifting force applied at substantially the center of the load.

BACKGROUND ART

Lifting boat trailers, per se, are generally well known, but they suffer several disadvantages. More specifically, such trailers operated by hydraulic systems are very expensive and complicated. Boat trailers having a front-mounted winch which applies a pulling force to the front end of the frame suffer from the disadvantages of requiring an unacceptably high force to be applied to the winch handle, causing bending of the frame members when such a high force is applied, and not being lowerable or collapsible to a sufficiently flat position to permit them to be driven underneath a pontoon boat sitting with its pontoons on the ground.

Lifting trailer s have also been disclosed in several U.S. patents. For example, U.S. Pat. No. 4,221,420 discloses a boat-and-car trailer having a first support assembly for the car and a second support assembly for the boat. Two pairs of pivotal scissor arms are secured to opposite sides of the first and second support assemblies and are hydraulically actuated to raise the boat support assembly from a collapsed position to a boat-supporting position. U.S. Pat. Nos. 4,286,800 and 4,406,477 disclose boat trailers having a collapsible boat-supporting structure, with the latter patent disclosing a winch and a cable pulley system which is used to raise a boat-supporting frame. U.S. Pat. No. 3,974,924 discloses a boat trailer having an aft cradle which provides mechanical leverage to assist in loading and unloading a boat. U.S. Pat. No. 4,637,770 discloses a pontoon boat trailer utilizing a winch and cable system for simultaneously applying a lifting force to the front and rear ends of a lifting frame pivotally attached by a parallelogram structure to a lower frame. U.S. Pat. No. 3,113,686, U.S. Pat. No. 4,318,632 and U.S. Pat. No. 4,365,923 further show the state of the art of lifting boat trailers.

It is to overcome the disadvantages of such prior structures that this invention is directed.

DISCLOSURE OF THE INVENTION

This invention comprises in general an elongate frame having a tongue pivotally attached near the front end of the frame, and a wheel unit for collapsibly supporting the frame substantially intermediate or center of the ends of the frame. In one embodiment, a hydraulic unit including a pair of cylinders is mounted at the front of the frame; one cylinder connected by a tube to the wheel unit for pivotally moving the wheel unit relative to the frame such as to lower the frame to enable the trailer to be moved below the frame of the pontoon boat, and then to raise the frame and boat to a transport position. The other cylinder is provided to move the frame and tongue relative to each other to maintain the frame level for transport purposes.

In an alternate embodiment, a winch and cable system may be provided in place of the one cylinder, and a jack unit maybe substituted for the second cylinder, to achieve the same results as the hydraulic system as described hereinafter.

To provide additionally for tending to maintain the pontoon boat frame level and evenly supported during transport, transversely and longitudinally spaced pairs of load supporting elements are rockably connected to the frame for engaging and supporting the pontoon boat at or slightly above the level of the frame such that flexing and bending of the frame during transport is normally not transferred to the boat frame.

Further, stability of the trailer particularly during transport is aided by having both wheels of the wheel unit connected to a common shaft mounted within a uniquely formed torsion axle assembly.

It is therefore an object of this invention to provide a new and novel trailer for raising and lowering a load, particularly a pontoon boat.

Another object of this invention is to provide a collapsible lifting force, applied upon raising to the approximate center of the load.

Yet another object of this invention is to provide a lift frame for a pontoon boat trailer where the weight of the load is automatically distributed equally to the lift frame.

Still another object of this invention is to provide a center lift trailer for raising and lowering a pontoon boat to and from a lowered position wherein the trailer can be moved below the ground supported frame of the pontoon boat for lifting purposes, and wherein only a single lifting frame is required for the trailer.

Another object of this invention is the provision of a mechanism for tending to maintain the frame in a level position for transport purposes, regardless of the height of the transport hitch.

It is yet another object of this invention to provide means for raising and lowering the center lift trailer frame which may be either a motor controlled hydraulic or a manually operated cable arrangement.

Still another object of this invention is the provision of a collapsible center lift pontoon boat trailer wherein in the unrestrained raised position of the frame, the wheel unit tends to collapse to lower the frame automatically.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 2 is a top plan view of FIG. 1;

FIGS. 3 and 4 are left side elevational views of the trailer of FIGS. 1 and 2 showing the frame and other parts in a raised transport position and a lowered, loading position, respectively;

FIG. 5A is an enlarged, fragmentary view of the forward left side of the trailer utilizing a hydraulic system, as taken along the line 5—5 in FIG. 2, certain parts foreshortened for clarity of illustration;

FIG. 5B is a view similar to FIG. 5A but showing a manually operated cable system as an alternative for the hydraulic system;

FIG. 11 is an enlarged vertical sectional view as taken along the line 11—11 in FIG. 3;

FIG. 12 is a vertically exploded, perspective view of the parts of the wheel unit and torsion axle assembly as shown assembled in FIG. 11; and FIG. 13 is a further enlarged sectional view as taken along the line 13—13 in FIG. 11.

BEST MODE FOR CARRYING OUT THE INVENTION

Figure 1:
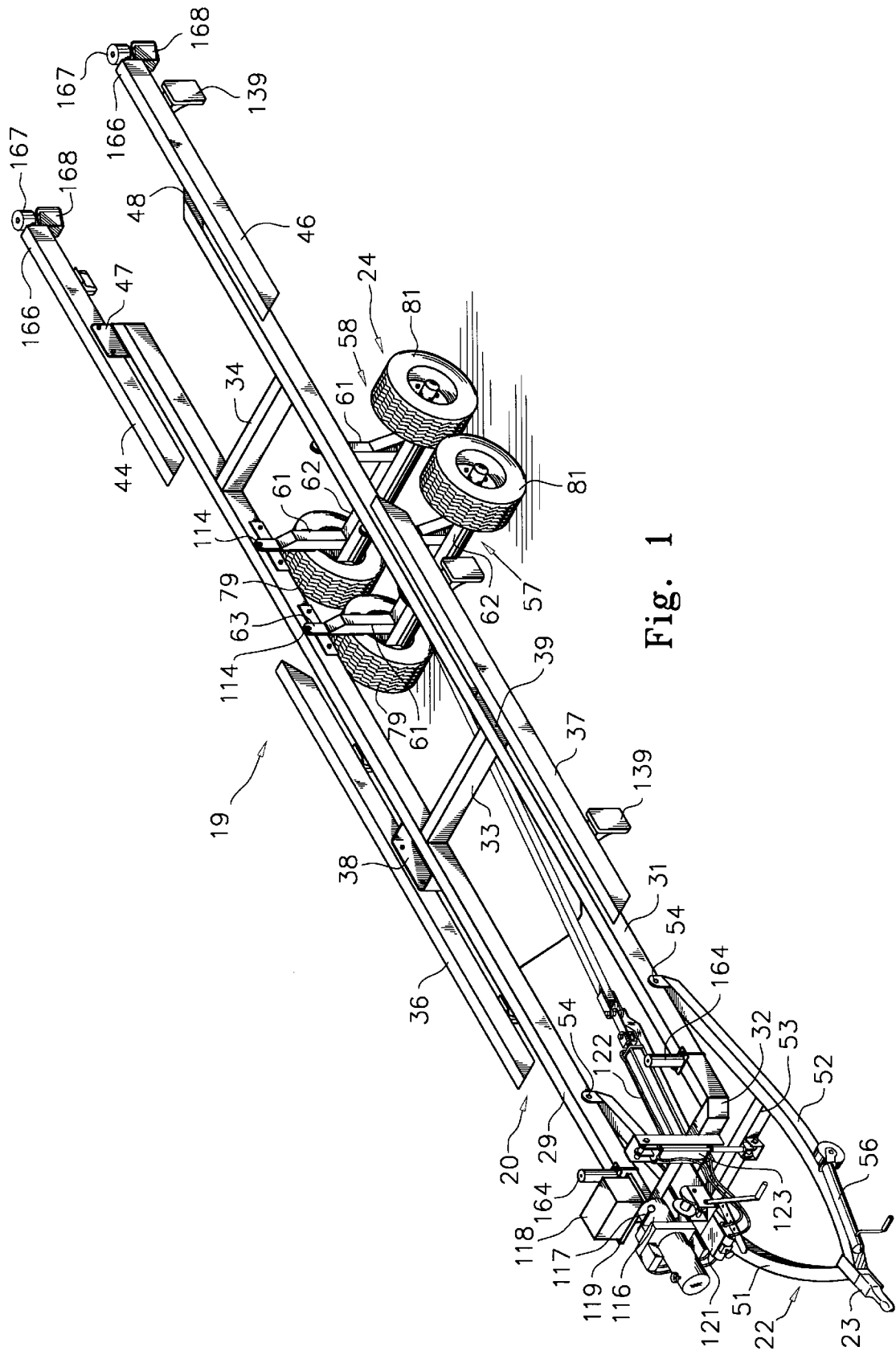
FIG. 1 is a perspective view of the pontoon boat center lift trailer of this invention.

Referring now to the drawings and particularly to FIG. 1, the trailer for transporting a pontoon boat of this invention is indicated generally at (19), and comprises generally an elongate frame unit (20) for supporting a pontoon boat (21) (FIG. 8), a tongue (22) with a coupler (23) at the front end for towing connection to a prime mover (25), a wheel unit (24) pivotally mounted at substantially the center of the frame unit (20) for effecting a center lift thereof, a first unit (26) for raising and lowering the frame unit (20), and a second unit (27) for maintaining the frame unit (20) level. As a part of the wheel unit (24) a special torsion axle assembly (28) (FIGS. 11–13) is provided for ensuring road stability.

Figure 8:
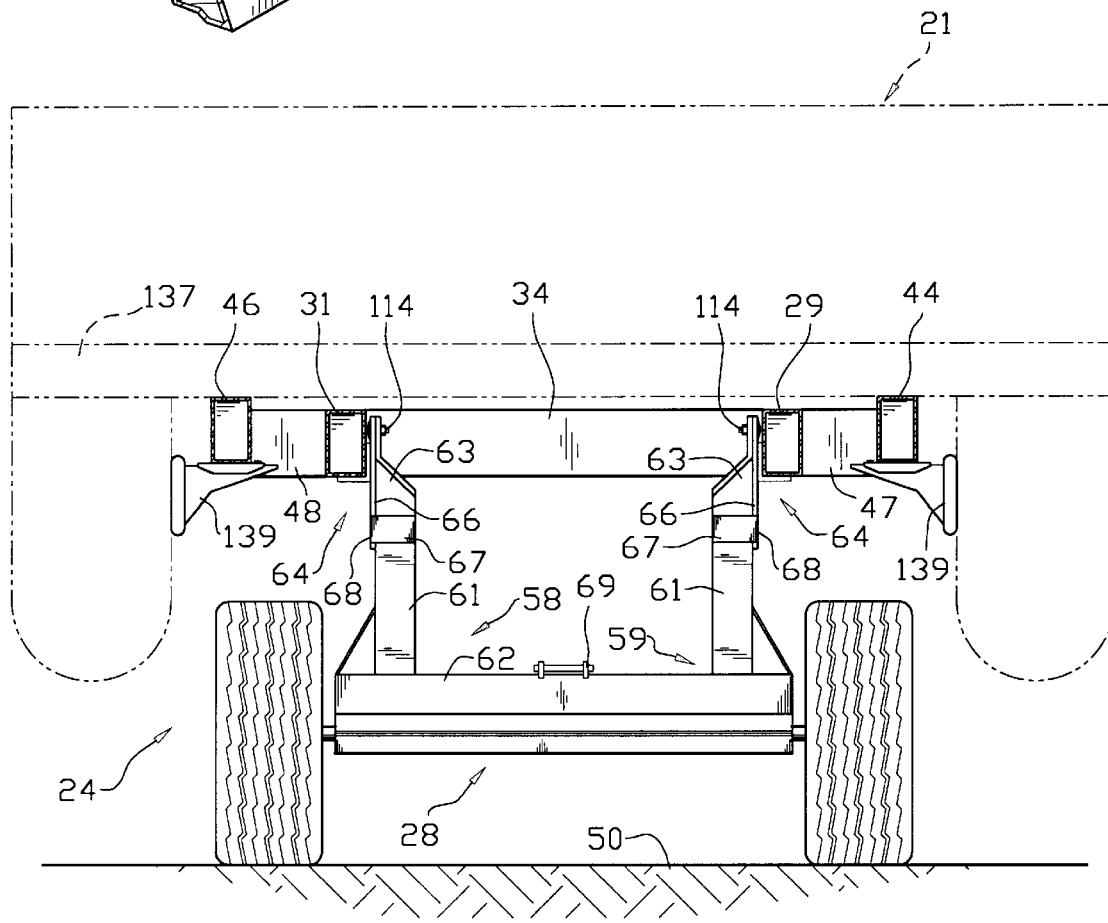
FIG. 8 is an end elevational view of the trailer of FIG. 1, and showing in phantom a pontoon boat supported on the trailer.

Referring more particularly to FIGS. 1, 2 and 8, the frame unit (20) comprises a pair of parallel, transversely spaced side members (29), (31) with a transverse front member (32), an intermediate cross member (33) and a rear cross member (34). Forwardly of the wheel unit (24), a transversely spaced pair of equal load elements (36), (37) are rockably mounted, each adjacent a frame side member (29), (31), on a bracket (38), (39), respectively, secured to an outer side of a respective side member (29), (31).

Figure 7:
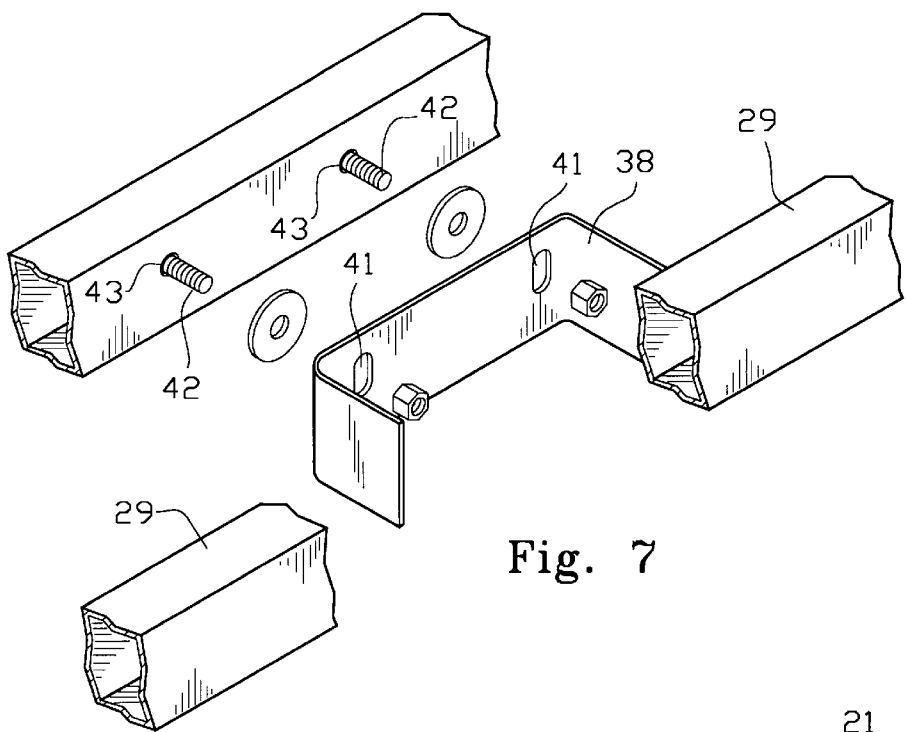
FIG. 7 is an exploded, fragmentary perspective view of frame associated elements from the right front of the frame, which parts are utilized for aiding in maintaining the load—the pontoon boat, level during transport.
Figure 9:
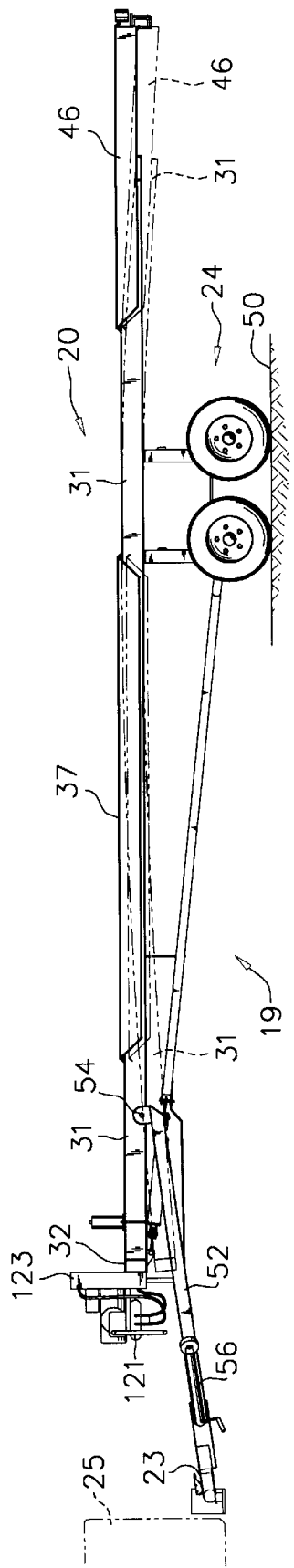
FIG. 9 is a view similar to FIG. 3 and showing by the use of phantom lines an exaggerated bowing or flexing of the frame caused by the load of the pontoon boat during transport.
Figure 10:
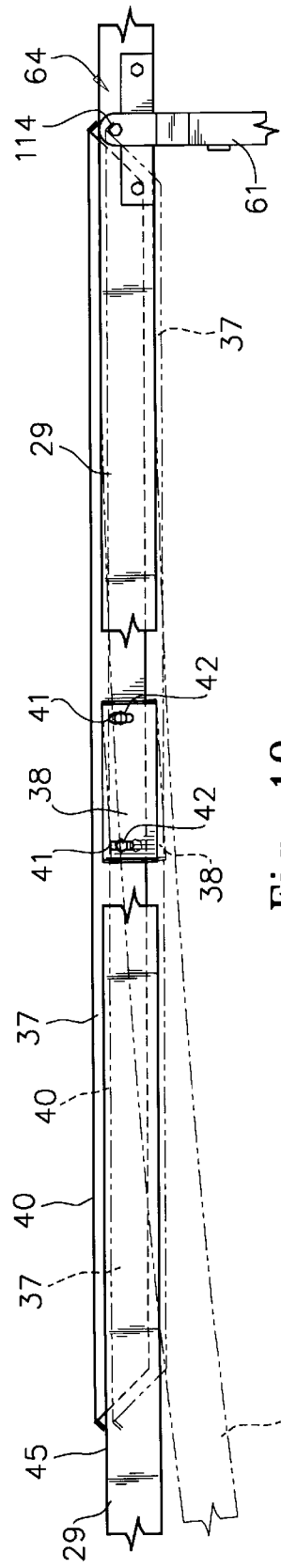
FIG. 10 is a detail, enlarged view of a front portion of the structure of FIG. 9 and showing by fragmented portions the tilting action of the frame associated elements to aid in maintaining the pontoon boat evenly supported during transport.

The upper surface (40) (FIG. 10) of each load element (36), (37) is spaced equal to or slightly above the upper surface (45) of each side member (29), (31). Longitudinally spaced, vertically extended slots (41) (FIG. 7) are formed in each bracket (38), (39) to receive fasteners (42) from an adjacent load element (36), (37); whereby as best shown in FIG. 9 and 10, upon placing a pontoon boat (21) (FIG. 8) upon the frame unit (20), due to the center lift support of the wheel unit (24), the frame unit (20) tends to bend slightly downwardly fore and aft of the wheel unit (24), the front load elements (36), (37) are capable of rockably adjusting in a vertical plane relative to the side members (29), (31) to tend to provide a level supporting surface for the pontoon boat (21).

Rearwardly of the wheel unit (24), a like pair of equal load elements (44), (46) (FIGS. 1 and 9) are also rockably mounted on brackets (47), (48) in the exact manner and height as the forward load elements (36), (37). Thus, as the remainder of the frame unit (20) flexes downwardly fore and aft of the wheel unit (24) due to the load, as illustrated by dash lines in FIG. 9, the upper surfaces (40) of all load elements (36), (37), (44), (46) tend to remain in a level condition relative to the ground surface (50).

The tongue (22) (FIG. 1) comprises a pair of forwardly converging sides (51), (52) joined forwardly to the hitch-type coupler (23), and with a cross member (53) rearwardly. The rear ends of the sides (51), (52) are pivotally connected at (54) to respective frame unit side members (32), (32). A ground engaging jack (56) may be supported on the tongue (22).

Figure 6A:
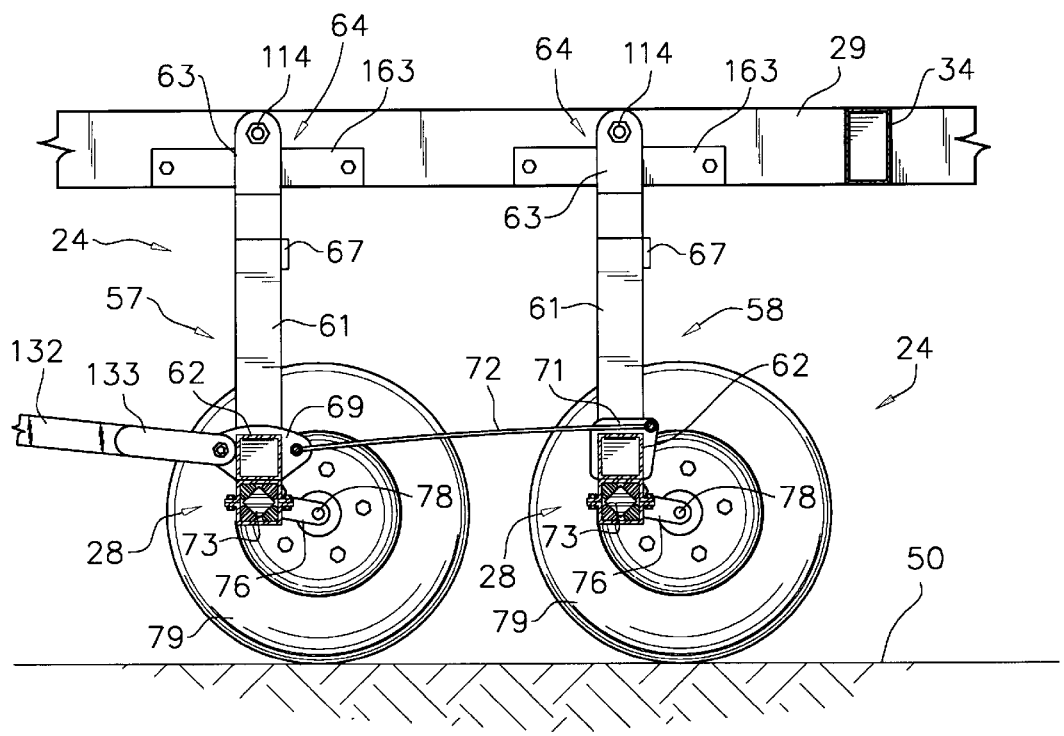
FIG. 6A is an enlarged, fragmentary view as taken along the line 6—6 in FIG. 2, and showing the frame in a raised position for transport.

The wheel unit (24) is illustrated as having a pair of wheeled devices (57), (58); however, only the use of a single device (57) or (58) may be required depending upon the load requirements. Both wheeled devices (57), (58) are identical, and only one (58) will be described. The device (58) includes a U-shaped element (59) having a pair of transversely spaced normally upright standards (61) connected at their bases by a transverse tube (62). Each standard (61) has an upper flange (63) pivotally mounted to a T-shaped bracket (64) (FIGS. 6A and 11). Each bracket (64) has a depending plate (66) for coaction with a stop member (67) secured across the rear surface of each standard (61) and with a projection (68) (FIG. 8) extended transversely. As the wheel unit (24) is moved forwardly from a collapsed position (FIG. 6B) to a raised portion (FIG. 6A) in a manner described hereinafter, the projections (68) on the standards (61) will engage the rear surfaces (70) of the plates (66), thus preventing further forward movement of the wheel unit (24) toward an opposite collapsed position. Where a pair of wheeled devices (57), (58) are required, they are interconnected by a link (72) pivotally connected to a pair of brackets (69), (71) such that movement of the front device (57) by action of the first unit (26) effects a tandem action of the rear device (58).

The torsion axle assembly (28) (FIGS. 6A, 6B and 11–13) comprises an elongated shaft (73) which may have a square cross section, with a crank arm (74), (76) at each end disposed normal to the length of the shaft (73), and with a pinion (77), (78) secured normal to each outer end of each crank arm (74), (76) respectively, each pinion (77), (78) then supporting a wheel (79), (81) for rotation thereon. To form the remainder of the assembly (28), a lower hat-shaped housing (82) with three right angular sides (83), (84), (86) and a pair of flanges (87) are placed below the shaft (73), with the shaft (73) placed non-concentrically relative to the housing (82) as best shown in FIG. (13). A pair of elongated, resilient cushioning elements (88), (89), of a generally circular shape in cross section, are placed into the left and right inner corners (91), (92) of the housing (82), and held by the housing (82) against the lower faces (93), (94), respectively, of the shaft.

A like pair of cushioning elements (96), (97) are then placed against the upper faces (98), (99) of the shaft (73) and held thereagainst by the upper inner corners (101), (102) of an upper hat-shaped housing (103), having three right angular sides (104), (106), (107) and a pair of flanges (108). With the housings (82), (103) held firmly together such that the flanges (87), (108) are engaged, they are temporarily fastened together as by tack welding along the outer edges at (109), (111) (FIG. 13) such that the force initially holding the housings (82), (103) together can be released, and the assembly (28) can be manipulated for further assembly. As the tack welds (109), (111) are insufficient to hold the housings (82), (103) together during normal use, the flanges (87), (108) are subsequently more permanently but removably fastened together as by a plurality of fasteners (112) inserted through aligned openings (113) formed in the flanges (87), (108). The assembly (28) is secured to the underside of the transverse tube (62), as by welding or the like, in a position best illustrated in FIGS. 6A, 8, 11 and 13.

Figure 6B:
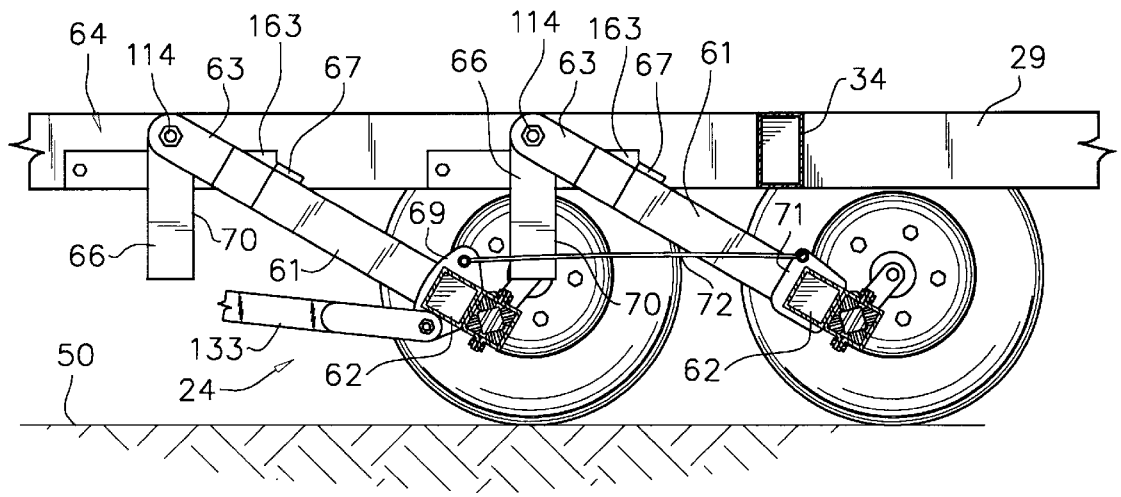
FIG. 6B is a view similar to FIG. 6A, but showing the wheel unit in a collapsed position with the frame lowered for loading purposes.

It will be noted that the crank arms (74), (76) (FIG. 6A) extend rearwardly from the shaft (73) and tube (62), thus placing the wheels (79), (81) rearwardly of the pivotal connections (114) of the standards (61) with the frame side members (29), (31). Due to this arrangement, the wheel unit (24) has a tendency to rotate rearwardly, or counter-clockwise as viewed in FIG. 6A, toward a collapsed position as shown in FIG. 6B.

The first unit (26), provided for raising and lowering the frame unit (20), as by pivotally moving the wheel unit (24) relative to the frame unit (20) has alternate structures; one hydraulically controlled and actuated as best shown in FIGS. 1 and 5A, and the other a cable arrangement as best shown in FIG. 5B. Similarly, the second unit (27) also is provided with either hydraulic or mechanical structures for working together with the first unit (26) arrangements.

The hydraulic structures comprise a 12-volt DC hydraulic pump (116) (FIG. 1) with a control lever (117) powered by a 12-volt battery (118), mounted on an appropriate support structure (119) at the front of the frame unit (20), the pump (116) hydraulically connected to a double select valve (121) further hydraulically connected to a first unit cylinder (122) and a second unit cylinder (123). The rear end (124) (FIG. 5A) of the cylinder (122) is pivotally connected at (126) with a frame weldment (127), and the piston end (128) is coupled by a strap (129) to the forward end (131) of an elongated tube (132), the rear end (133) (FIG. 6A) of which is pivotally connected to a front wheel device bracket (69). A U-shaped bar (130) (FIG. 1), secured at opposite ends to the side members (29), (31) supports the tube (132) intermediate its ends.

Assuming the wheel unit (24) in an upright position (FIG. 6A), to lower the frame unit (20) for loading a pontoon boat (21), the selector valve (121) is placed in position to operate the leveling cylinder (123). The motor lever (117) is manipulated to then activate the leveling cylinder (123) to lower the front end (134) (FIG. 5A) of the frame unit (20), downwardly, thus bringing the frame unit front end (134) closer to the tongue (22). The selector valve (121) is then changed to direct fluid to the lift cylinder (122), where operation of the pump (116) activates the cylinder piston (136) to extend same, forcing the wheel unit (24) via the tube (132) to pivot rearwardly relative to the frame unit (20) (FIG. 4). When the piston (136) is fully extended, the wheel unit (24) is in the collapsed position of FIG. 6B.

With the frame unit (20) fully lowered, the trailer (19) can be wheeled to a position where the frame unit (20) is disposed below the frame (137), shown in dash lines in FIG. 8, of the pontoon boat (21). To locate the pontoon boat (21) properly longitudinally of the trailer (19), a winch (135) (FIG. 5A) with cable (not shown) may be provided for connection to the pontoon boat (21). A plurality of guide brackets (139) (FIG. 8) may be affixed to the side members (29), (31) for aiding in centering the pontoon boat (21) upon the trailer frame unit (20). Reversing the pump fluid flow by its lever (117), the selector valve (121) is operated to retract the piston rod (136) whereby the wheel unit (24) is returned to its original raised condition, effecting a center lifting of the pontoon boat (21) by the frame unit (20).

To ensure against an unintended collapsing of the wheel unit (24), an elongated safety strap (141) (FIG. 5A) is connected at its rear end to a pin (142) at the front end (131) of the tube (132), passes through a saddle (143) secured below the tongue cross member (53), and has a plug (144) dropped into an opening (not shown) formed in the strap (141) forwardly of the channel (143). The plug (144) is removed prior to the collapsing procedure, and replaced upon the wheel unit being returned to an upright position. The plug (144), as shown in FIG. 5A engages the saddle (143) upon rearward movement of the tube (132) and safety strap (141), and thus prevents further unintended rearward movement of the tube (132).

The alternate cable arrangement for the first and second units (26) and (27), respectively, as best shown in FIG. 5B includes substituting a winch (146), a cable (147), a first pulley (148) and a second pulley (149) in the place of the hydraulic structure; plus the substitution of a jack unit (151) for the second unit hydraulic cylinder (123). More particularly, the winch (146), mounted below the support (119) (FIG. 5B), has its cable (147) trained about an upper pulley (152), pulley (149) being a double and attached to the tube front end pin (142), back to the first pulley (148), thence trained about the lower pulley (153), and with the cable tied off at a connection (154) on the first pulley (148). The handle-operated jack unit (151) is supported by a bracket (156) on the frame unit front end (134) and is operable via its rod (157) pivotally connected at (158) to the tongue (22) to raise and lower the frame unit front end (134) relative to the tongue (22). A second safety strap (159) (FIG. 5B) is pivotally connected at its front end to the pin (142), slides through a saddle (161) supported below the rear cross member (34) and has a plug (162) inserted therein rearwardly of the saddle (161). This arrangement further protects against the wheel unit (24) from moving too far forwardly of its upright position (FIG. 6A); as by, for example, attempted over-winching forwardly of the cable (147).

Operation of the cable arrangement, again assuming the wheel unit (24) up (FIG. 6A); comprises cranking down the frame front end (131) by operating the jack unit (151), removing the plug (144) from the front safety strap (141), releasing the tension of the winch cable (147) on the tube (132) thereby permitting the wheel unit (24) to roll rearwardly automatically to its collapsed position, the rearward movement stopped when the standard projections (68) strike either the frame members (29), (31) or the upper plates (163) of the brackets (64), then loading the pontoon boat (21) as before, operating the winch (146) to reel in the cable (147) to raise the center lift wheel unit (24), reinserting the plug (144) into the strap (141) forwardly of its saddle (143), and operating the jack unit (151) to raise the frame unit front end (134) to level the frame unit (20).

Although not a part of this invention, a pair of upright rollers (164) (FIG. 5A) may be mounted forwardly on the frame side members (29), (31) against which the bow of the pontoon boat (21) may be snugged. Further, at the rear end (166) of each side member another roller (167) may be mounted to protect against damage to a tail light (168) adjacently mounted.

I claim:

1. The method of assembly of a torsional axle assembly comprising the steps of:

forming a first elongated outer section having at least three sides formed at right angles in cross section;

inserting a first pair of elongated resilient elements each into an opposed interior corner of said outer section;

placing an elongated shaft having a square cross section within said outer section in a nested relationship with said first resilient elements, leaving a pair of free outer surfaces of said shaft;

placing a second pair of elongated resilient elements each into engagement with a said free outer surface of said shaft;

forming a second elongated outer section and engaging said first section therewith to enclose said first section and form a right angular interior therewith, whereby said free outer surfaces nest with said second resilient elements;

forcing said first and second sections together into a normal use position against resistance of said pairs of resilient elements;

temporarily fastening said first and second section together in said normal use position, and releasing said force; and releasably fastening said first and second sections together for normal use to obviate failure of said temporary fastening during normal use.

2. A torsional axle assembly comprising:

a first elongated outer section having at least three sides formed at right angles in cross section and having opposed interior corners;

a pair of elongated resilient elements each inserted into one of said interior corners;

an elongated shaft having a square cross section placed within said outer section in a nested relationship with said resilient elements, whereby said shaft has a pair of continuous outer surfaces free of engagement with said resilient elements;

a second pair of elongated resilient elements each placed into engagement with a said free outer surface of said shaft;

a second elongated outer section placed into engagement with said first section, said second section having a square cross section and having opposed interior corners within said second section, each interior corner of said second section engaged with one of said second pair of elements;

means temporarily fastening said first and second section together in a normal use position prior to normal use of said torsional axle assembly; and means fastening said first and second sections together in said normal use position for normal use of said torsional axle assembly to obviate failure of said temporary fastening means.

* * * * *